US011883838B2

(12) United States Patent
Pungetti et al.

(10) Patent No.: US 11,883,838 B2
(45) Date of Patent: Jan. 30, 2024

(54) APPARATUS FOR APPLYING PAINT TO MAINLY FLAT PARTS

(71) Applicant: CEFLA SOCIETA' COOPERATIVA, Imola (IT)

(72) Inventors: Cristian Pungetti, Ozzano dell'Emilia (IT); Angelo Carriero, Zola Predosa (IT); Stefano Chiarini, Conselice (IT); Samuel Montefiori, Imola (IT)

(73) Assignee: CEFLA SOCIETA' COOPERATIVA

( * ) Notice: Subject to any disclaimer, the term of this patent is extended or adjusted under 35 U.S.C. 154(b) by 0 days.

(21) Appl. No.: 17/617,124

(22) PCT Filed: Jun. 22, 2020

(86) PCT No.: PCT/IB2020/055866
§ 371 (c)(1),
(2) Date: Dec. 7, 2021

(87) PCT Pub. No.: WO2020/255103
PCT Pub. Date: Dec. 24, 2020

(65) Prior Publication Data
US 2022/0226854 A1 Jul. 21, 2022

(30) Foreign Application Priority Data
Jun. 21, 2019 (IT) ........................ 102019000009711

(51) Int. Cl.
*B05B 13/04* (2006.01)
*B05B 14/46* (2018.01)
(Continued)

(52) U.S. Cl.
CPC .......... *B05B 13/0447* (2013.01); *B05B 14/43* (2018.02); *B05B 14/46* (2018.02);
(Continued)

(58) Field of Classification Search
USPC ....... 118/326, 309, 324, 313, 315, 321, 323, 118/62, 63; 454/50–55
See application file for complete search history.

(56) References Cited

U.S. PATENT DOCUMENTS

2020/0276605 A1* 9/2020 Bubek ..................... B05B 14/43

FOREIGN PATENT DOCUMENTS

CN 104107770 A * 10/2014 ......... B05B 13/0221
EP 1733800 A2 12/2006
(Continued)

OTHER PUBLICATIONS

English Translation CN104107770A (Year: 2014).*

*Primary Examiner* — Yewebdar T Tadesse
(74) *Attorney, Agent, or Firm* — Laubscher & Laubscher

(57) ABSTRACT

Apparatus for painting mainly flat products including a spray booth, in its turn including a plenum, a conveying belt for conveying products at least a device for applying paint, and at least one suction plant, wherein the plenum of the spray booth has a symmetric M-shape including, from the respective peripheries to the centre of the plenum:

two first descending surface portions tilted towards the periphery;

two second lateral surface portions parallel to the belt;

two third descending surface portions, with a tilt towards the centre, opposite the tilt of the first portions;

a fourth central surface portion parallel to said belt, the fourth central surface portion being closer to the conveying belt than the lateral parallel sections.

11 Claims, 9 Drawing Sheets

(51) Int. Cl.

| | |
|---|---|
| ***B05B 16/60*** | (2018.01) |
| ***B05B 16/00*** | (2018.01) |
| ***B05B 14/43*** | (2018.01) |
| *B05B 15/52* | (2018.01) |

(52) U.S. Cl.
CPC .............. *B05B 16/60* (2018.02); *B05B 16/95* (2018.02); *B05B 15/52* (2018.02)

(56) References Cited

FOREIGN PATENT DOCUMENTS

| | | | |
|---|---|---|---|
| EP | 3000534 | A1 | 3/2016 |
| EP | 3278881 | B1 | 7/2018 |
| FR | 2405758 | A1 | 5/1979 |
| GB | 1393202 | | 2/1975 |
| JP | 2002128578 | A | 5/2002 |

* cited by examiner

APPARATUS FOR APPLYING PAINT TO MAINLY FLAT PARTS

CROSS-REFERENCE TO RELATED APPLICATIONS

This application claims priority of PCT/IB2020/055866, filed Jun. 22, 2020. Application No. PCT/IB2020/055866 claims priority of IT102019000009711, filed Jun. 21, 2019. The entire content of these applications is incorporated herein by reference.

BACKGROUND OF THE INVENTION

The present invention relates to the technical field of apparatuses for applying paint to mainly flat parts (panels), known on the market as automatic sprayers. In particular, the present invention relates to a plenum shape, characterized by an M-shape, and to different advantageous forms of the support for spray guns. An embodiment of the present invention refers to the advantageous combination of said M-shaped plenum with a form of the support for spray guns, in particular to a rotating carousel of oval shape having the two long sides parallel to one another and perpendicular to the feeding direction of the parts to be painted.

In this context, plenum means a ceiling or upper wall that is able to distribute an airflow entering into the closed space of the booth while the painting takes place. Fans force air into the booth, the fans being able to be adjusted in order to vary the speed and the quantity of air input into the spray booth in a time unit. The distribution of air must be as uniform as possible and the speed of air must be controlled. In some points of the plenum the airflow can vary, while it must be constant over time in that specific point. The adjustment of inlet fans is intended to compensate the pressure drop, so that the distribution of air to said plenum is maintained inside optimal pre-set limits.

Spray booths are known that through automatic devices (reciprocators, carousels, rotating arms) spray paint onto products parts to be painted.

Spray paint application entails that not all the sprayed paint hits the product; the paint that is not applied to the product partly finishes on the product conveying system, and partly hovers in the air inside the spray booth itself. This last portion of sprayed paint is called overspray, and is partially intercepted by the spray booth suction system.

Non-intercepted overspray tends to contaminate spray booth internal walls, gathering on them up to the point of compromising manufacturing quality and leading to major waste of painted products. Therefore, costly maintenance and cleaning of the spray booth itself become mandatory.

The overspray intercepted by the suction system is conveyed towards spray booth filters, thanks especially to an airflow generated by the suction system itself. In this path, the overspray is controlled in a more proper way thanks to the emission of an airflow from the plenum.

FR2405758 of Manuel Garcia Sanchez discloses a mobile roof for a spray painting booth. The booth is designed for the manual painting of motor vehicles, performed by a human operator. Said roof, which is a filtering ceiling, not a plenum in the sense explained above, has three portions, a central portion 2, and two side sectors 3 and 4 which go upwards in an upper direction: in other words, overall the roof has a convex shape. Said ceiling can move vertically, i.e. rise and lower, according to the pressure conditions inside the booth itself, in order to prevent explosions due to the paints and fuel of the motor vehicle painted inside the booth.

EP1733800A2 of the same applicant shows a spray painting booth, also equipped with a plenum, a transport system for advancing panels, at least one device for spraying the paint and at least one suction system. The plenum of the application EP1733800A2 also has a broken line profile, however different from that of the present invention. The plenum of EP1733800A2, also equipped with a symmetrical shape, has the following profile, proceeding from the periphery towards the center of the cabin:

two first descending portions inclined towards the periphery;

two second vertical portions perpendicular to the transport system;

a third central portion parallel to said transport system.

JP2002128578A of Tono Yogyo K K and GB1393202A of Atlas Copco A B disclose a rotating support for spray guns. The rotating support is moved along two parallel, rectilinear tracts joined by two half-circles. This allows a plurality of guns spraying at the same time in a direction perpendicular to the parts to be painted in transit.

The present invention seeks to provide a spray booth having a plenum provided with an improved air circulation in the booth, in order to control as much as possible the phenomenon of overspray. This can be obtained by generating an airflow more similar to the geometry of the vortex generated by the combined effect of the jets of the spray guns and of the suction.

This aim is obtained with an apparatus having the features of the independent claims. Embodiments and refinements are specified in claims appended thereto.

The object is obtained with a spray booth according to the present invention, which is provided with an M-shaped plenum, i.e. a plenum the central portion of which is lower than the immediately adjacent lateral portions; more peripherally, the plenum is lower again, reaching two ends that are lower than the central portion.

In an embodiment of the spray booth, in the spray booth there is moreover a rotating device in which the spray guns follow an oval closed path provided with two parallel sides and two arcs. This device supports spray guns, and can be moved vertically, moving the spray guns to/from the part to be painted. Each gun support is provided with a distributor block supplying the gun; said distributor block allows the painting product to be recirculated.

The M-shape of the plenum forms two expansion chambers, in which the kinetic energy of the paint supplied by the gun is spontaneously and progressively reduced: this allows the suction system to intercept the overspray.

The apparatus according to the present invention has very high productivity combined with a quality of painted parts that is just as high. Indicatively, the speed of transit of the parts to be painted can range from 8 to 20 m/min, while the weight of paint applicable to said parts ranges 80 to 300 $g/m^2$. The apparatus can work over three work shifts, i.e. 24/24 h.

The advantages of the present invention are linked to the improvement in the control of overspray flow. This has several consequences:

cleaner painting process, which, for the user of the apparatus, translates into a lower number of wasted painted parts;

lower need of cleaning and maintenance of the spray booth;

lower consumption of air to obtain overspray control (lower number of air renewals per time unit) with respect to other solutions with the same productive potentiality;

recovery of a higher quantity of paint by the auto-cleaning conveyor, in the cases wherein the paint can be re-utilized.

Experimentally, it was shown that the plenum according to the present invention allows 15% more paint to be recovered than with a paint booth of the prior art produced by the same applicant, which has a flat plenum.

With respect to the rotating spray gun support with an oval shape with two parallel sides, the advantages are linked to the following features:

The path of the spray guns consisting of two parallel sides and two joining half-circles can be followed in both directions, clockwise and anti-clockwise;

The position of the spray guns with respect to the parts to be painted transiting underneath can be height-adjusted; in other words, the spray guns can be moved towards or away from the parts to be painted;

Paint recirculation occurs in the top portion of the spray gun support, and therefore in the portion protected from overspray; in the lower part there are only the arms supporting the spray guns, which eases cleaning operations;

The oval rotating gun support is provided with a cleaning device that enables an automatic cleaning cycle of all the guns supported by said gun support to be performed.

BRIEF DESCRIPTION OF THE DRAWINGS

The present invention will be disclosed below with the help of the following figures, which show.

DETAILED DESCRIPTION OF THE INVENTION

Figure 1:
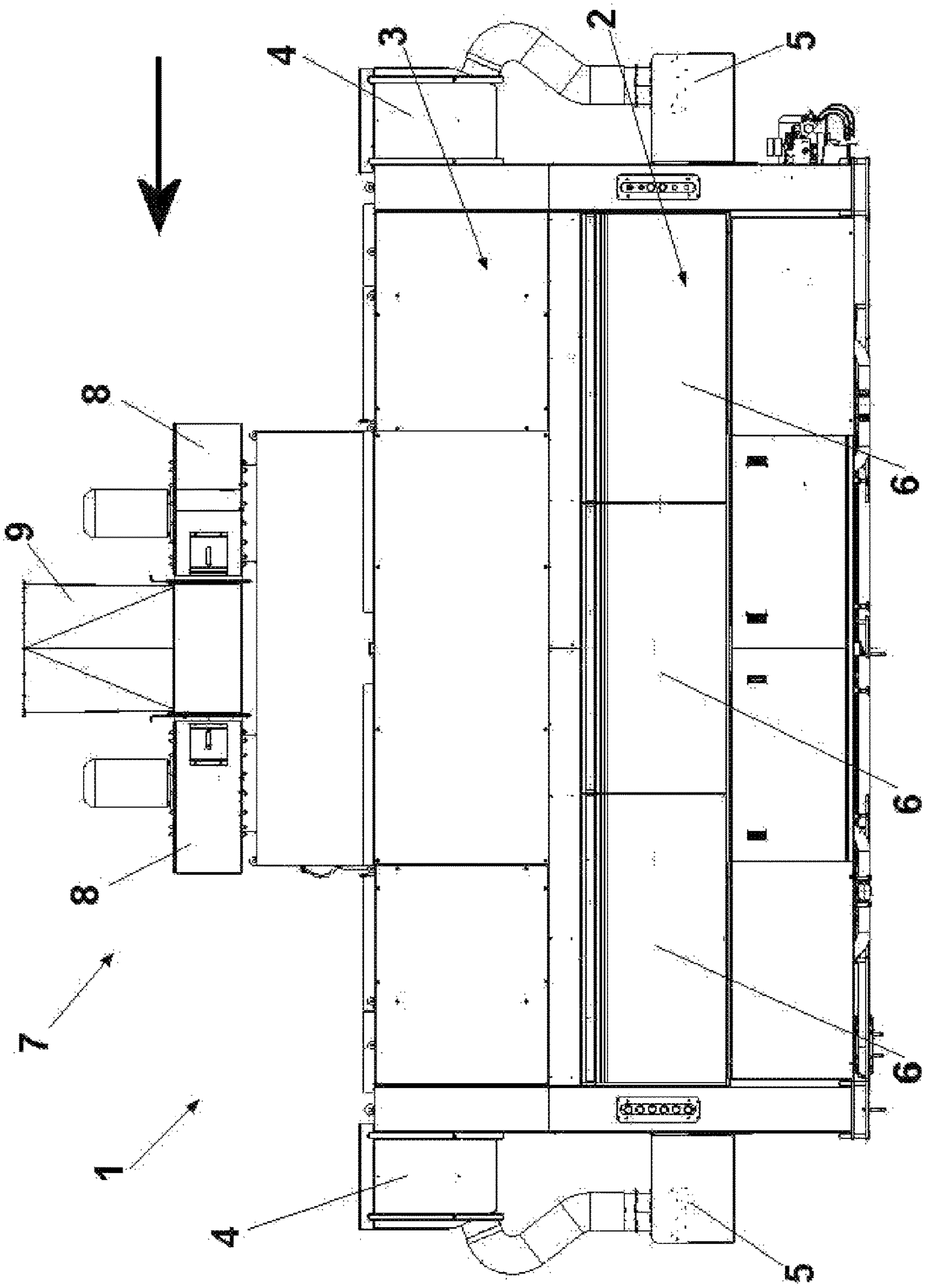
FIG. 1 Lateral view of an apparatus according to the present invention.

FIG. 1 shows an apparatus 1 according to the present invention. The direction of the parts to be painted is shown by the arrow in bold print. A spray booth 2, a series of chambers generically indicated with 3 that are above said spray booth 2, two air inlet units 4, and two air inlet hoods 5 are visible. The booth 2 has transparent protections 6, which can be opened to access the spraying area, and a tower 7 for cleaning air, in order to separate the overspray from the air crossing the apparatus. Said tower 7 has two suction fans 8 releasing the air coming from the spraying booth 2 into the environment through an exhaust stack 9. The portion of the apparatus 1 in which the paint spraying occurs (spray booth 2) is at said protections 6.

It is worthwhile noting that, for particular applications, the air inlet units 4 can be absent, in this case, they are replaced by alternative units having the same function but which supply hyperfiltered air.

Figure 2:
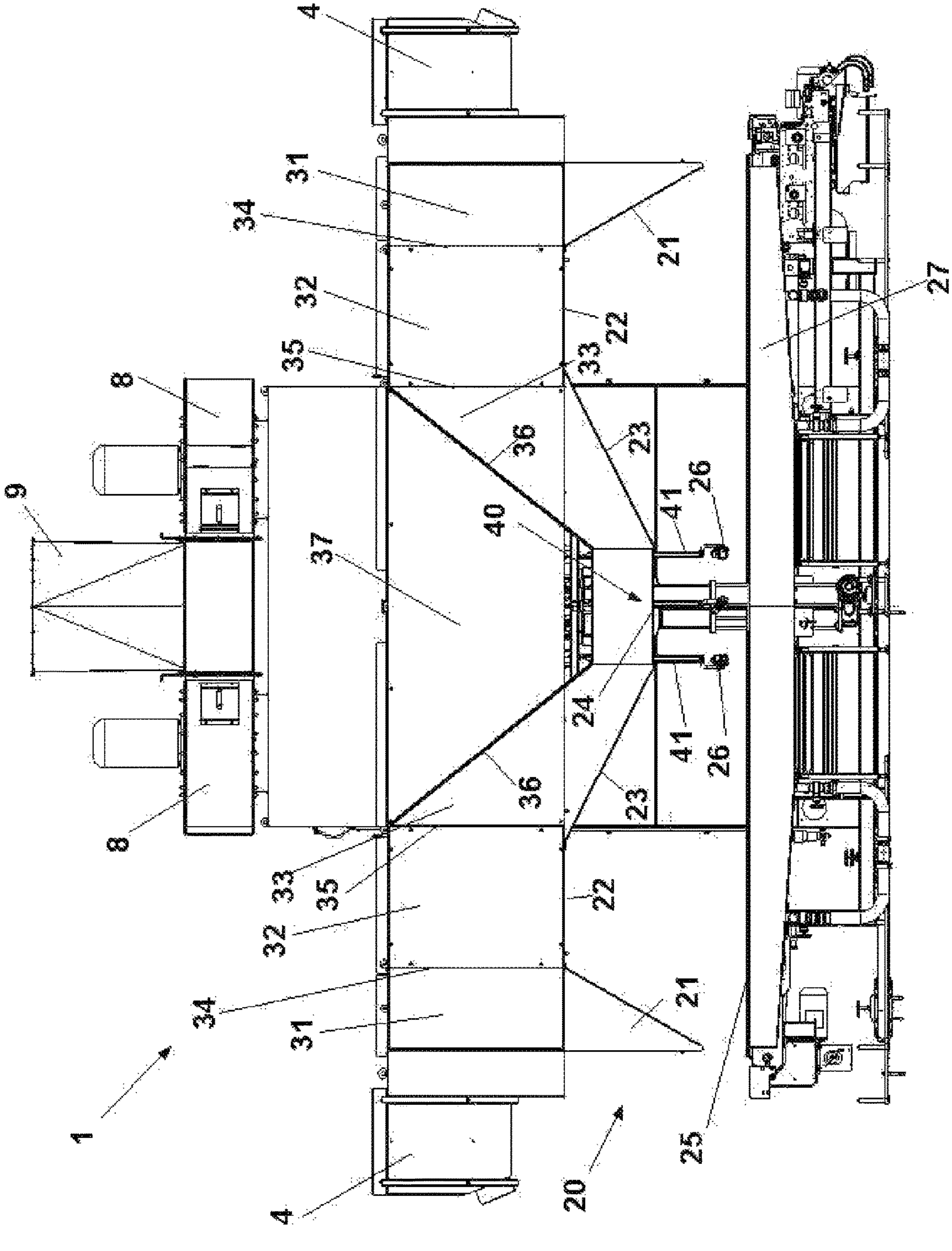
FIG. 2 Lateral section of an apparatus according to the present invention.

FIG. 2 shows a lateral section of the apparatus 1 according to the present invention. In an embodiment, a rotating device 40 follows its oval closed path under the central parallel portion 24, while the guns 26 move closer to and away from the observer positioned at the side of the apparatus 1. In other words, the short oval side is observed from apparatus 1 side. The longer (longitudinal) axis of the oval is perpendicular to the feeding direction of the parts to be painted.

Figure 2A:
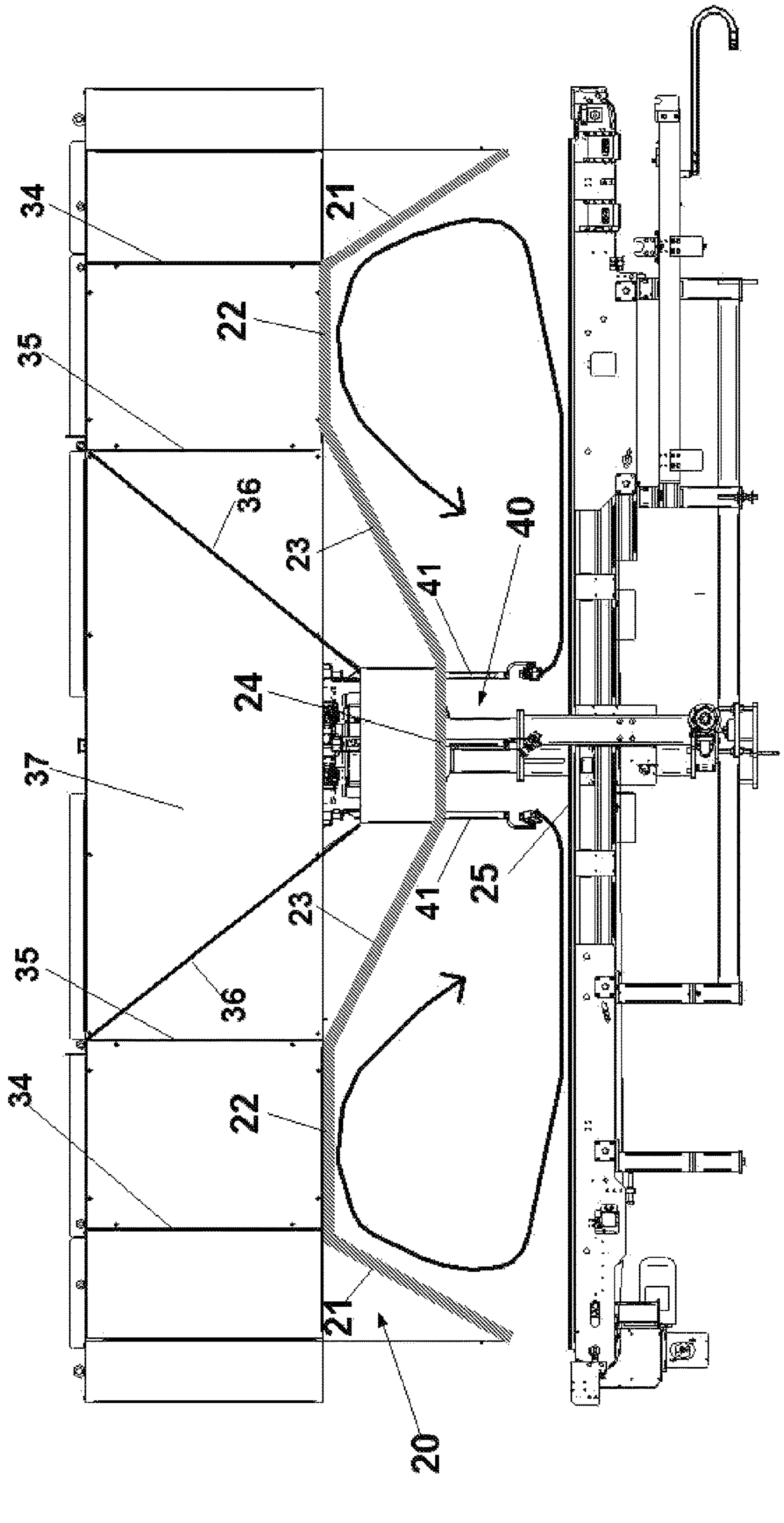
FIG. 2A Detail of the lateral section.

FIG. 2A also shows a lateral section of the apparatus 1 according to the present invention, too, but in a simplified version. The grey highlighting allows the M-shape of the plenum 20 to be appreciated, in the centre of which there is the rotating device 40. Moreover, FIG. 2A allows the overspray movement to be appreciated, which is indicated by the two spiral arrows under the M-shaped plenum.

From the periphery of the apparatus to the centre, said plenum 20 has two first external descending portions 21 tilted towards the periphery, which do not touch a belt 25 for conveying the products to be painted. After said portions 21 there are two lateral surface portions 22, parallel to the belt 25 conveying the parts. Two central tilted surface portions 23 follow that descend towards the rotating device 40 (that therefore have a tilt opposite the first portions 21). The two central descending surface portions 23 are connected through a parallel central surface portion 24, which is parallel to the conveying belt 25, which is placed lower (i.e. nearer the conveying belt 25) than the parallel lateral surface portions 22. The M-shaped plenum 20 is symmetric, and the two sides of the structure of the portions 21, 22, 23, 24 that has just been disclosed is identical. The various surface portions 21, 22, 23, 24 will from now on be referred to only as "portions".

It should be pointed out that the air exiting the various portions 21, 22, 23, 24 of the plenum always exits perpendicularly to each surface 21, 22, 23, 24.

The speed at which the air exits the descending external portions 21 is such as to contrast the residual kinetic energy of the paint dispensed by spray guns 26, so that the overspray tends to recirculate towards the lateral parallel portion 22, to then be suctioned by the filtration system.

In the portions 22 and 23 of the plenum the speed of air exiting the surface of said plenum can be lower than that of the air exiting the portion 21, because they are in area zone in which the kinetic energy of the overspray is lower. The reduction of speed of the inlet air in the zones underneath the portions 22 and 23 of the plenum allows to an overall airflow to be obtained that is lower than in the apparatuses where the speed of the air exiting the plenum is homogeneous for all the sections 22, 23, 34, the air speed being equal to the air speed of the portion 21.

In said central parallel portion 24 of the plenum there is an airflow outlet from the plenum 20 that has the function of preventing the overspray generated by the spray guns 26 from dirtying the guns 26 themselves and the support 41 of said guns.

The partialization of the air speed in the different portions 21, 22, 23, 24 of the plenum is achieved by controlling the airflow supplied by fans 4 to the booth, adjusting the airflow itself through separating baffles 34, 35, which bound chambers 31, 32, 33 of the plenum itself. Owing to the presence of the chambers 31, 32, 33 formed by the respective baffles 34, 35, just two inlet air units can be used, which are placed on the respective sides of the apparatus 1. By modifying the crossing surface of the baffles 34, 35, the airflow in the different portions 21, 22, 23 24 of the plenum can be varied, so adjusting also the speed of the air entering the spray booth 2.

It is worthwhile noting that two walls 36 bound the volume in which the air is moved. Said walls 36 in fact bound a volume 37, containing the rotating device 40 is placed, and to which no air is conveyed in a forced manner.

For clarity's sake, the portion indicated with 3 in FIG. 1 includes the chambers 31, 32, 33, the volume 37 not being supplied with forced air.

In an alternative not shown embodiment, the separating baffles 34, 35 are not perpendicular to the ground as in the Figures, but are tilted, or have a different extension, or have a different degree of permeability.

Figure 3:
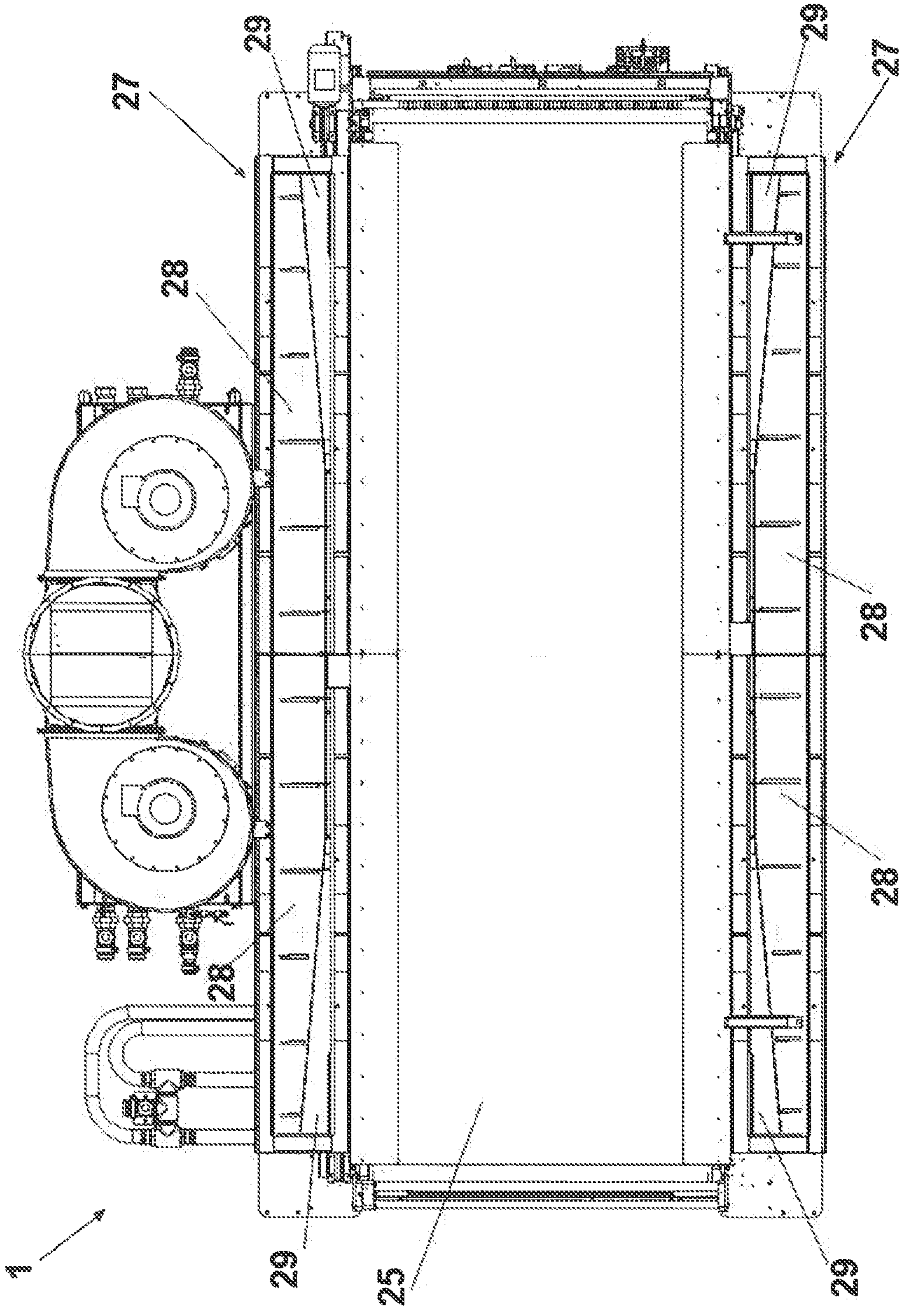
FIG. 3 Top view of an apparatus according to the present invention in a section performed underneath the spray guns.

The filtration system is provided in the form of lateral suction tanks 27, better observable in FIG. 3. Said lateral suction tanks 27 collect a first portion of overspray, the one provided with lower speed, whereas the overspray vortex, indicated with the spiral arrows visible in FIG. 2A, which forms under the external descending portion 21, lateral parallel portion 23 and central descending portion 23, allows the progressive slowing down of the overspray, allowing the suction system to capture a second portion of slowed down overspray subsequently.

The dimensions of the plenum 20 and its shape represent the best compromise between the overall dimensions of the apparatus 1 on one hand, and on the other hand the speed and quantity of air needed for containing the overspray, preventing the generation of paint accumulation inside the apparatus. In other words, a bigger apparatus would spontaneously lead to a lower overspray accumulation, but would be too cumbersome and too expensive to find its place in a production line. Indicatively, the dimensions of the spray booth 2 are 3.5 m×6.5 m, with a distance of 1.5 m between parallel lateral portion 22 and conveying belt 25.

FIG. 3 shows a top view of a section performed on a horizontal plane immediately above the conveying belt 25. The Figure shows said suction tanks 27, which are compliant with the prior art. Two tanks 27 are adjacent to the conveying belt 25, having a length equal to the length of the conveying belt 25 itself (upper outward section). The conveying belt 25 is a known closed belt conveyor moved by a motorized roller and an idle roller. Said tanks 27 are in the form of tilted planes 28 on which water flows, so that surfaces are kept clean. This water falls into the channel 29 for air suction and water conveying. The channel 29 is provided with a passage section larger in the peripheral portions of the apparatus, and narrower in the central portions of the apparatus, so that the suctioning speed is kept constant at the sides of the conveying belt 25.

Said tanks 27 are a known water filtration system. Alternatively, said water filtration system can be replaced by a dry filtration system, prior art, too, or alternatively by other filtration systems prior art.

Experimentally, the best performance of the apparatus according to the present invention is obtained by combining the M-shaped plenum 20 with the oval rotating carousel 40, which combination is the described embodiment. Nonetheless, the M-shaped plenum 20 can also be combined with spraying devices of different shape, e.g. a rotating carousel the guns of which follow a circular path, or any configuration of a spraying device in which the spraying direction goes from the centre to the periphery of the apparatus. For example, in an alternative not shown embodiment, the same M-shaped plenum 20 can be used combined with spray guns placed in the centre of the apparatus that move with a rectilinear reciprocal movement along a direction orthogonal to the conveying direction of the products 30 to be painted, with such a direction that the paint jet goes from the centre of the apparatus to the periphery.

Figure 4:
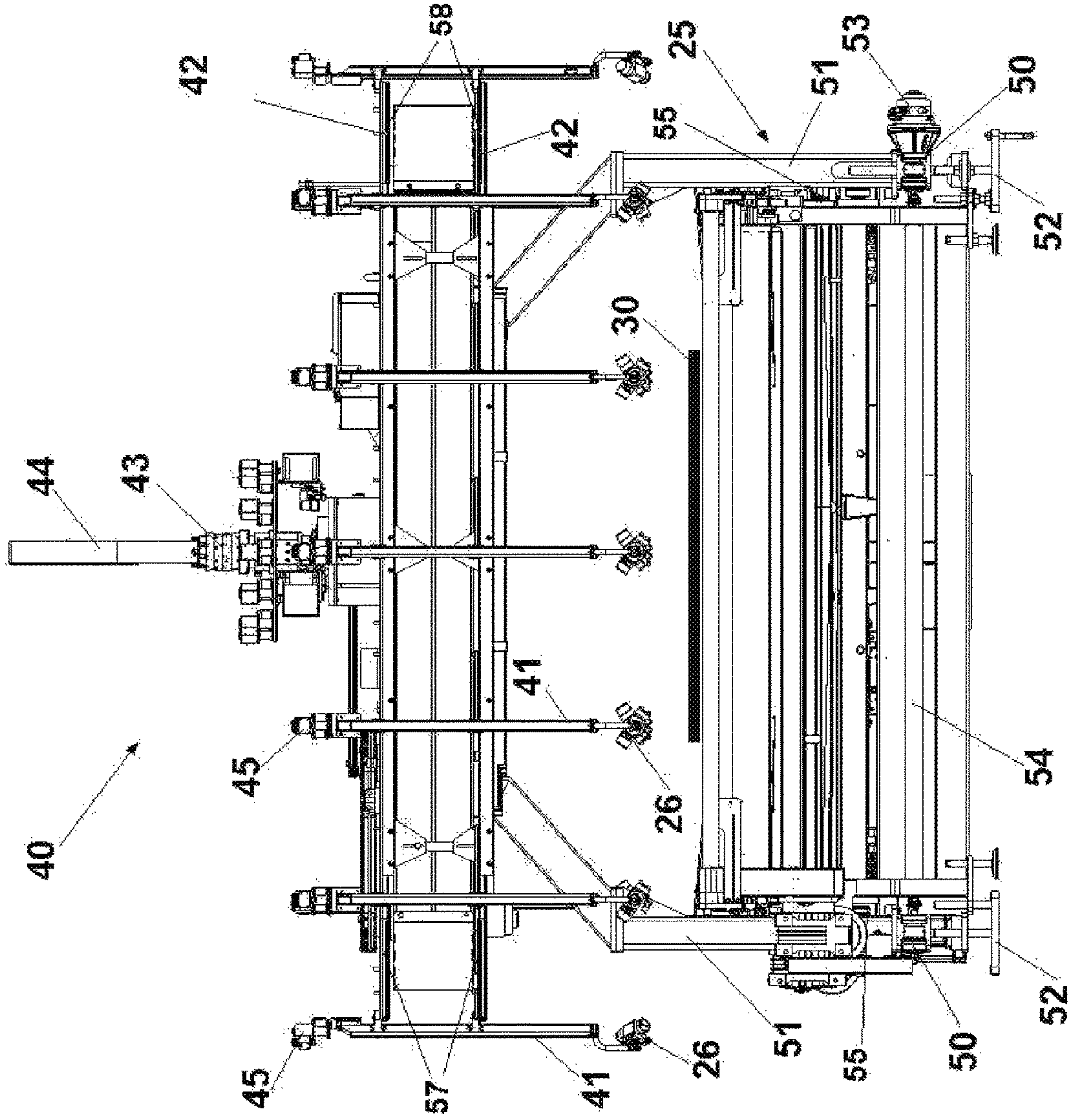
FIG. 4 Detail of the oval rotating spray device, seen from the inlet of the apparatus, front view.

FIG. 4 shows a detail of the rotating device 40, seen from the entry of the products to be painted. Said device 40 is provided with a plurality of spray guns 26, in particular twelve or twenty-four guns. Each gun 26 is supported by a suitable arm 41, connecting the gun 26 to a pair of moving chains 42. In this Figure, for simplicity's sake, only one pipe chain44 is shown, of which more details are given below.

Figure 5:
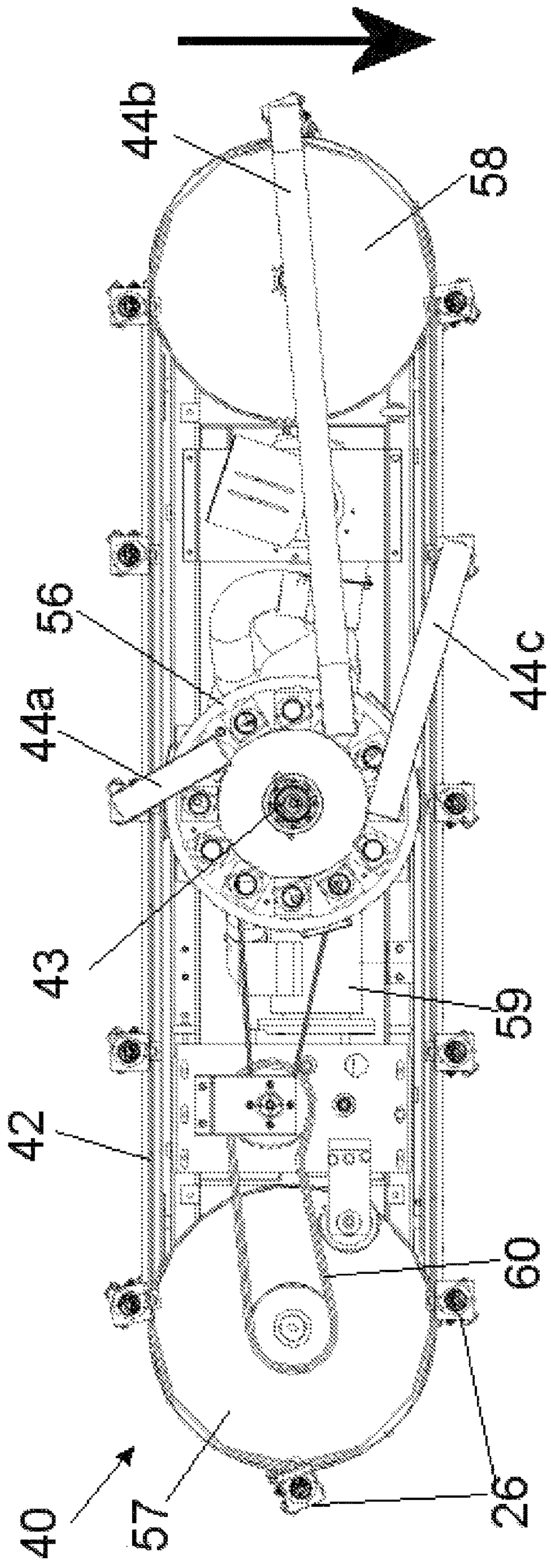
FIG. 5 Detail of the oval rotating spraying device, top view.

FIG. 5 shows the same rotating device 40 seen from the top. This view allows the oval shape of the moving chains 42 to be appreciated, provided with two parallel long sides connected together by two arc portions.

The spray gun support arms 41 are supported by the pair of moving chains 42 which move along the oval movement trajectory of the guns between a pair of motorized sprocket wheels 57 and a pair of idle sprocket wheels 58 (both visible in FIG. 4). The pair of motorized sprocket wheel 57 is moved by an electric gearmotor 59 through a chain transmission 60.

Figure 6:
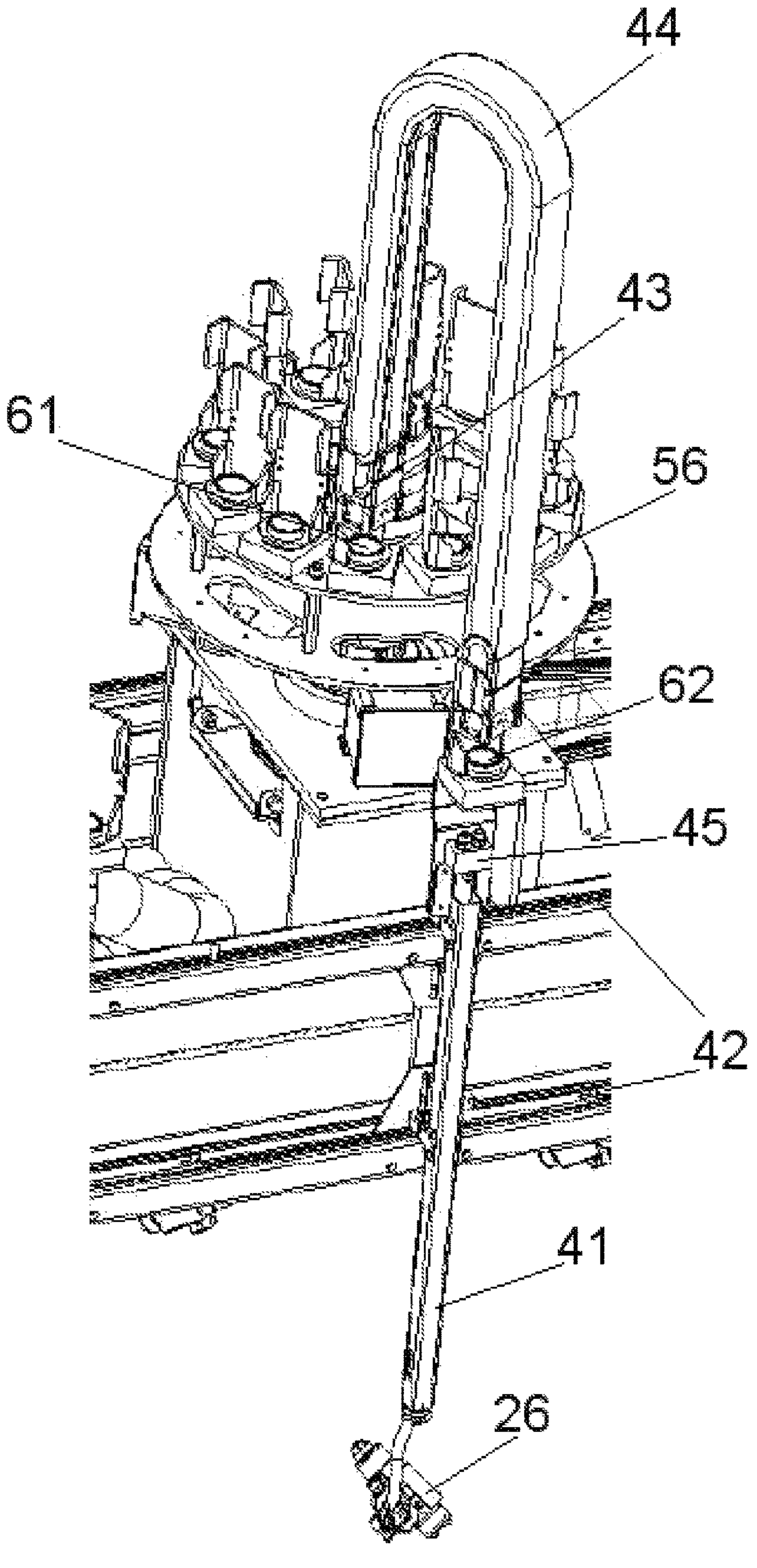
FIG. 6 Detail of a portion of the oval rotating device, axonometric view.

FIG. 6 shows a detail of a spray gun 26 fixed on a spray gun support arm 41, supported by two moving chains 42.

Each pipe chain 44 contains the tubes for the delivery and return of the paint to each gun 26. The two ends of each pipe chain 44 are fixed:

- The first end is fixed to a first rotating support 61, in its turn fixed to a rotating disc 56;
- The second end is fixed to a second rotating support 62, which in its turn is fixed to the gun support 41, in its turn fixed to the moving chains 42.

The two rotating supports 61 and 62, which are constructively identical, allow the rotation of the two ends of the pipe chain44, allowing it to move always on the same plane, preventing mechanical warping which would lead to its breakage. In fact, the rotating disc 56 is in phase with the chains 42, i.e. a full circle of the rotating disc 56 corresponds to a full circle of the moving chains 42.

In order to understand the operation of the oval rotating device 40, the three FIGS. 4, 5 and 6 must be considered together.

The same gearmotor 59, again with a chain transmission, moves the disc 56 too, which moves the first end 61 of the pipe chain44 and a rotating joint 43.

Said rotating joint 43 (visible also in FIG. 6) is used for supplying the guns 26; its operation is explained in detail in document EP3278881B1 of the same applicant.

The rectilinear tracts of the oval rotating carousel are perpendicular to the feeding direction of the parts, indicated by the arrow in bold print in FIG. 5. Said rectilinear tracts represent the working portions of the trajectory, i.e. the portions in which the guns 26 spray paint on the products 30 transiting underneath. In the two connecting arc portions, the dispensing of paint by the guns 26 is interrupted. This configuration of the moving chains 42 allows two spraying sections to be obtained in which there is a sequence of spray guns 26 to allow a great flow of paint to be dispensed onto the transiting parts 30. In order to obtain the needed quantity of dispensed paint, arranging a suitable number of guns along the trajectory is sufficient. For the application field of the present apparatus, the optimal number of guns for applying the product is twelve: obviously, the skilled person can adjust the number of guns according to the quantity of paint to be dispensed and to the speed of the transiting parts. Obviously, the speed of translation of the guns 26 can be adjusted to harmonize the speed with the speed of the parts 30 to be painted.

Through supply pipes and a supply pump (which are not shown), the paint is sent from storage reservoirs (which are not shown), placed outside the apparatus 1, to the rotating joint 43 placed at the centre of the rotating device 40. From a not shown distributor connected to said joint 43 the supply pipes (that are not shown) lead away, directed to the individual guns 26. In order to allow the correct movement of the pipes from the central portion of the rotating joint to the peripheral portions on which the guns 26 move, said pipe chains 44 are used. For simplicity's sake, in FIG. 4 only one pipe chain 44 is shown, but naturally each gun 26 is provided with its own pipe chain 44 when the guns 26 are twelve. Should the guns be twenty-four, the number of pipes is doubled and each pipe chain 44 supports a double number of pipes. Downstream of the pipe chain 44, the pipe pairs divide and each supplies its own gun.

FIG. 6 shows a pipe chain 44 in axonometric view. Each resting pipe chain has an inverted U-shape, which is highly visible in FIG. 6.

During the rototranslation of guns 26, substantially the inverted U is distorted, in which the two arms of the U are distanced from each other and at the same time the height of the inverted U is reduced.

FIG. 5 allows the shape modification to be appreciated of the pipe chain 44 during spraying. The pipe chain 44*a* is shown in a minimum extent position, corresponding to the view of FIG. 6; said pipe chain 44*a* feeds the gun that is in the position corresponding to the lesser axis of the oval. The pipe chain 44*b* is shown in a maximum extent position; said chain 44*b* feeds the gun which is in the position corresponding to the greater axis of the oval chain 42. The pipe chain 44 is shown in an intermediate extent position between the two the end positions 44*a* and 44*b*. During the movement along the oval trajectory, the two rotating supports 61 and 62, representing the two ends of each pipe chain 44, move away and closer to each other: this variation in distance is compensated by the different positions and shapes that the pipe chain 44 can adopt, widening and narrowing the two arms of the inverted U which form the pipe chain 44 itself, and undergoing a corresponding reduction/increase in height.

The moving chains 42 and the disc 56 are moved by the gearmotor 59 at the same time: a relative motion is generated between the two ends of the pipe chain 44. During the gun movements, the rotating supports 61 and 62 move along two different trajectories: the rotating support 61 follows a circular trajectory on the disc 56, while the rotating support 62 follows an oval trajectory on the chains 42.

It is worthwhile highlighting that pipe chains have to move their mobile ends only and only on their working plane only, in order to function properly. Otherwise, if the mobile ends of a pipe chain 44 are moved on different planes, transverse loads are generated, which lead to the breakage of the pipe chain 44 itself. In the known art, such pipe chains 44 normally are used to guide the movement of pipes or cables between two mobile ends that move on rectilinear and coplanar pathways. In this case, unlike what happens in the prior art, pipe chains are used on a path provided with a rototranslation movement, with a rectilinear and a rotatory component It is worthwhile remembering that paint tends to settle, and therefore the supply circuits of painting apparatuses are provided with a return branch to form a recirculation system keeping the paint in motion. As a consequence, the number of pipes specified above must be doubled, in order to have a paint delivery and return system.

The paint delivery branch goes from the storage reservoir (which is not shown) to a recirculating block 45 (visible in FIG. 6), while the paint return branch goes from the recirculating block 45 to the storage reservoir (which is not shown) placed outside the apparatus. Each gun 26 is provided with its own recirculating block 45; in other words, the number of recirculating blocks 45 is equal to the number of guns 26. The end branch supplying paint, not undergoing recirculation, goes from the recirculating block 45 to the respective gun 26. The arm 41 supporting the gun is placed inside the spraying area; the diameter of the pipe of this last branch has a smaller section than the rest of the circuit, so as to obtain a more compact gun support arm 41, which is provided with a reduced exposed surface and therefore gets less dirty. All this reduces the possibility that paint residues detach and fall on the transiting product 30.

A further feature of the rotating device 40 is that the device 40 can be moved, towards or away from the device, and therefore the guns 26, to/from the transiting products 30 to be painted. The whole device 40 is supported by two support columns 51, visible in FIG. 4. These columns 51 are supported by two lifting jacks 50, which rest on the ground through support plates 52. This vertical movement occurs by working on said jacks 50 through a motor 53. The synchronous motion of the two jacks 50 is achieved by a drive shaft 54. In order to ensure a suitable support of the device 40, the rotating carousel 40 is guided with guiding systems 55 that are anchored to the conveying system of the products 30 to be painted.

Figure 7:
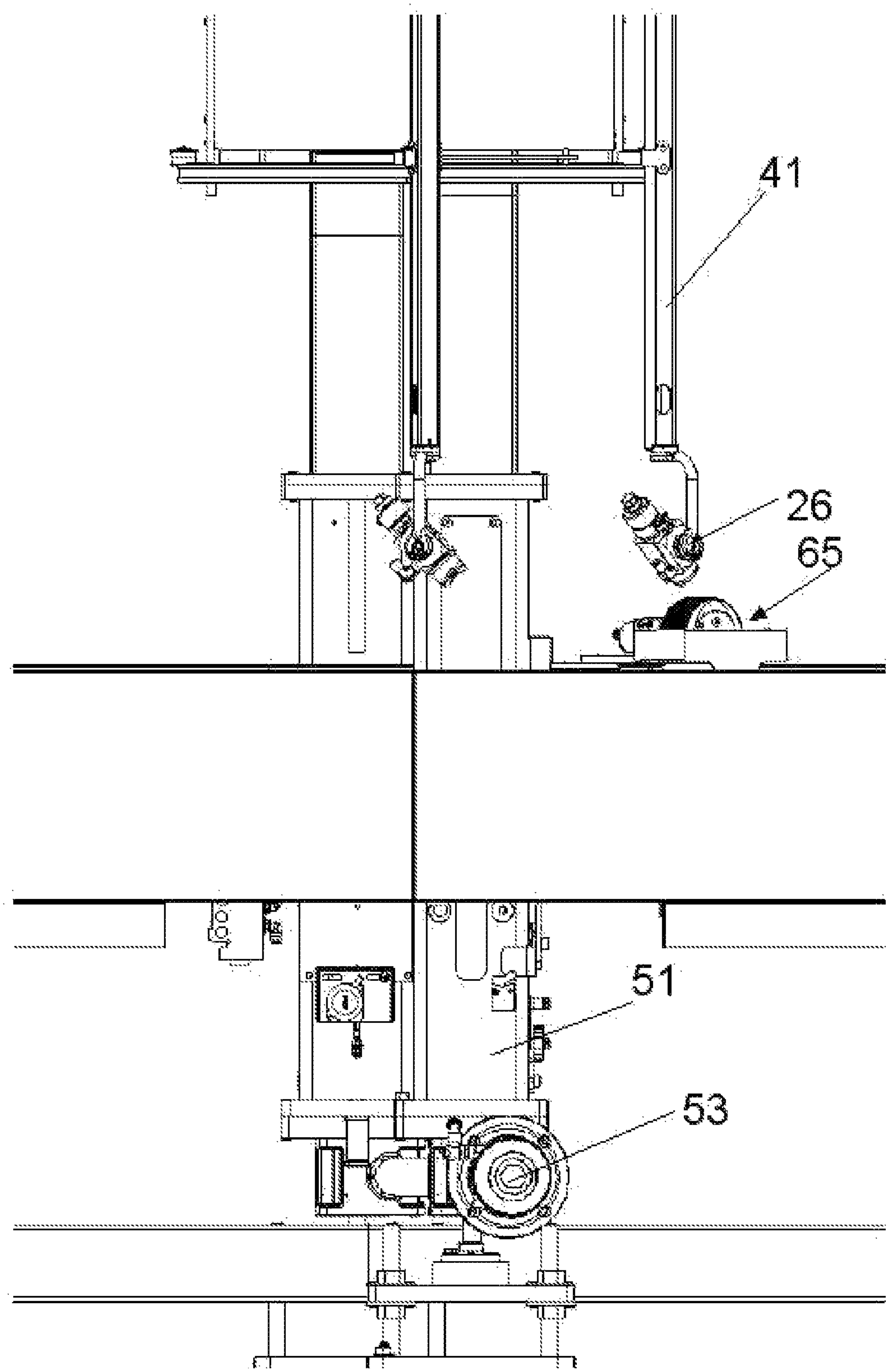
FIG. 7 Detail of the oval rotating device in a lateral view, orthogonal to the view shown in FIG. 4.

FIG. 7 shows a detail of the oval rotating carousel 40 in a lateral view, i.e. from the short side of the oval, orthogonal to the view shown in FIG. 4.

Figure 8:
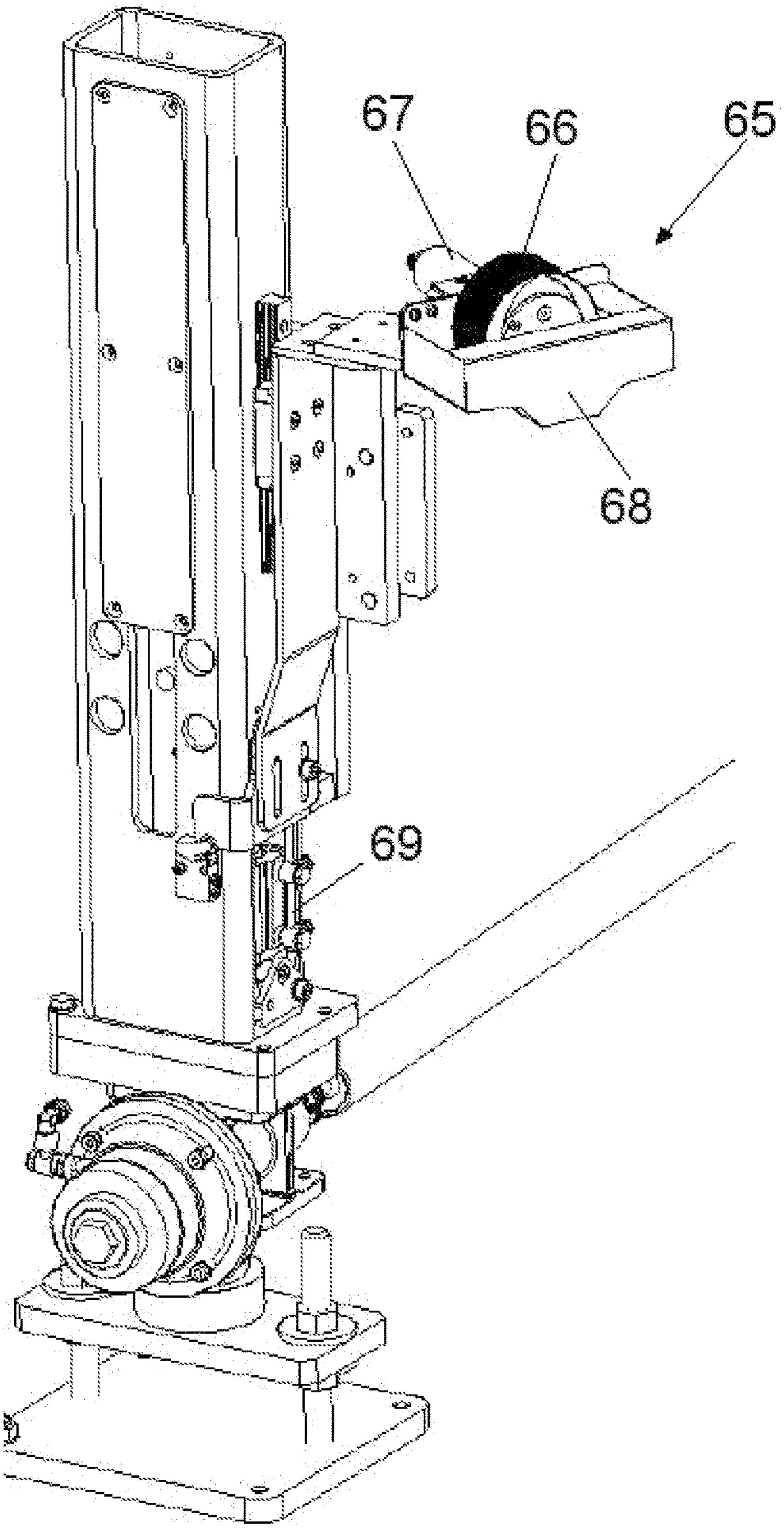
FIG. 8 Detail of the cleaning device, axonometric view.

FIG. 8 shows a detail of the spraying device in axonometric view.

The two FIGS. 7 and 8 taken together allow the presence of a cleaning device 65 to be appreciated. Such a device 65 is prior art, and has a rotating brush 66, moved by a motor 67. The lower half of this brush 66 is contained inside a tray 68, containing solvent or the detergent liquid.

This rotating brush is intended for cleaning the nozzles of the guns 26 when it is brought into a position suitable for interfering with the gun 26.

During spraying, when the spray guns 26 are active, said cleaning device 65 is in the rest position (bottom, shown in FIG. 7), distanced from the guns. At the end of a spraying cycle, the cleaning device 65 is automatically brought into its working position (top) and can proceed to an automatic cleaning cycle of all the guns. Each gun 26 travels a tract of the oval path to be placed at the device 65, above the device 65, and subsequently the cleaning device is raised. The nozzle of each gun undergoes a brushing of a pre-set duration of a few seconds (indicatively, from 5 to 10 seconds). The duration of an automatic cleaning cycle is therefore the duration of the pre-set cleaning time multiplied by the number of guns present. In an automatic cleaning cycle, all twelve or twenty-four guns present are cleaned.

The position of the cleaning device 65 is defined: in order to perform the cleaning of all the guns 26, the cleaning device has to be lifted to the height of the guns 26. The passage of a gun 26 to the next occurs while the cleaning device 65 is in the lower rest position, while when the gun arrives at the cleaning device 65, the device 65 is lifted to the working position. In other words, during a cleaning cycle the cleaning device undergoes a number of translations corresponding to the number of guns present. This translation movement is performed by a pneumatic cylinder 69, visible in FIG. 8.

Not all commercially available spray guns are identical, an adjusting arrangement is accordingly provided to allow the correct positioning of the brush 66 with respect to the nozzle of the specific gun 26.

Finally, it is worthwhile specifying that in addition to the automatic cleaning that operates as explained above, also focused manual cleaning can be performed of the single spray gun 26.

Each gun 26 with its respective support arm 41 is marked with a progressive number, e.g. from one to twelve or from one to twenty-four, which allows the gun 26 to be identified univocally. For example, let the case be considered in which gun number eleven sprays poorly because the nozzle thereof is clogged. The apparatus 1 is provided with a program allowing the apparatus 1 to bring the desired gun, e.g. gun number eleven, at the greater axis of the oval. A human operator can remove the corresponding glass protection 6 and proceed to the manual cleaning of the nozzle of gun number eleven.

The invention claimed is:

1. An apparatus for painting flat products including a spray booth, in turn including a plenum having two opposite ends and a central portion, a conveying belt for conveying products, at least one device for applying paint, and at least one suction plant, wherein the plenum of the spray booth has a symmetric M-shape portion including in each half of the M-shape portion, from one respective end to the central portion of said plenum in sequential order:

an external first surface portion ascending from the one respective end and tilted inward;

a lateral second surface portion parallel to the conveying belt;

a central third surface portion, descending to the central portion with a tilt opposed to that of the external first surface portion; and the central portion which comprises a central fourth surface portion parallel to said conveying belt, which is closer to said conveying belt than the lateral second surface portion.

2. The apparatus according to claim 1, wherein the plenum is permeable to air, and wherein a direction of airflow is always perpendicular to each surface portion of the plenum.

3. The apparatus according to claim 2, wherein there is at least one separating baffle to distribute air inside chambers upstream of the plenum, so that the maximum speed of air is dispensed by the more peripheral external first surface portions, while air speed progressively decreases in the other surface portions towards the central fourth surface portion.

4. The apparatus according to claim 3, wherein at least two separating baffles are provided which are perpendicular to the ground.

5. The apparatus according to claim 3, wherein at least two separating baffles are provided which are tilted with respect to the ground.

6. The apparatus according to claim 3, wherein at least two separating baffles are provided and which have a different extent and/or a different degree of permeability from one another.

7. The apparatus according to claim 1, wherein there is at least one air delivery unit for forcing the entry of air through said plenum.

8. The apparatus according to claim 7, wherein there are two air delivery units.

9. The apparatus according to claim 1, wherein the at least one suction plant has a filtration system.

10. The apparatus according to claim 9, wherein the filtration system is a water filtration system or a dry filtration system.

11. The apparatus according to claim 9, wherein the at least one suction plant has a filtration system or a separating system for separating between paint nebulized in the air and air.

* * * * *